US008781205B2

(12) United States Patent
Glock et al.

(10) Patent No.: US 8,781,205 B2
(45) Date of Patent: Jul. 15, 2014

(54) AUTHENTICATION OF SECURITY DOCUMENTS, IN PARTICULAR BANKNOTES

(75) Inventors: Stefan Glock, Lemgo (DE); Eugen Gillich, Lemgo (DE); Johannes Georg Scheade, Wurzburg (DE); Volker Lohweg, Lemgo (DE)

(73) Assignee: KBA-Notasys SA, Lausanne (CH)

( * ) Notice: Subject to any disclaimer, the term of this patent is extended or adjusted under 35 U.S.C. 154(b) by 210 days.

(21) Appl. No.: 13/389,769

(22) PCT Filed: Aug. 11, 2010

(86) PCT No.: PCT/IB2010/053638

§ 371 (c)(1), (2), (4) Date: Apr. 5, 2012

(87) PCT Pub. No.: WO2011/018764

PCT Pub. Date: Feb. 17, 2011

(65) Prior Publication Data

US 2012/0328179 A1 Dec. 27, 2012

(30) Foreign Application Priority Data

Aug. 11, 2009 (EP) .................................... 09167609

(51) Int. Cl.
*G06K 9/00* (2006.01)

(52) U.S. Cl.
USPC .......................................................... 382/135

(58) Field of Classification Search
None
See application file for complete search history.

(56) References Cited

U.S. PATENT DOCUMENTS

2002/0154778 A1* 10/2002 Mihcak et al. ................ 380/262
2004/0264732 A1* 12/2004 Tian ............................. 382/100

OTHER PUBLICATIONS

Xiao-Yue Jiang ; Rong-Chun Zhao, "Texture segmentation based on incomplete wavelet packet frame", Machine Learning and Cybernetics, 2003 International Conference on Machine Learning and Cybernetics, Xi'an, Nov. 2-5, 2003, vol. 5, Digital Object Identifier: 10.1109/ICMLC.2003.1260125, Publication Year: 2003 , pp. 3172-3177 vol. 5.*

* cited by examiner

*Primary Examiner* — Atiba O Fitzpatrick
(74) *Attorney, Agent, or Firm* — Seager, Tufte & Wickhem LLC

(57) ABSTRACT

There is described a method for checking the authenticity of security documents, in particular banknotes, wherein authentic security documents comprise security features (41-49; 30; 10; 51, 52) printed, applied or otherwise provided on the security documents, which security features comprise characteristic visual features intrinsic to the processes used for producing the security documents. The method comprises the step of digitally processing a sample image of at least one region of interest (R.o.I.) of the surface of a candidate document to be authenticated, which region of interest encompasses at least part of the security features, the digital processing including performing a decomposition of the sample image by means of wavelet transform (WT) of the sample image. Such decomposition of the sample image is based on a wavelet packet transform (WPT) of the sample image, preferably a so-called two-dimensional shift invariant WPT (2D-SIWPT).

35 Claims, 12 Drawing Sheets

AUTHENTICATION OF SECURITY DOCUMENTS, IN PARTICULAR BANKNOTES

TECHNICAL FIELD

The present invention generally relates to the authentication of security documents, in particular of banknotes. More precisely, the present invention relates to further improvements of the invention disclosed in International Application No. WO 2008/146262 A2 of Jun. 2, 2008 entitled "AUTHENTIFICATION OF SECURITY DOCUMENTS, IN PARTICULAR OF BANKNOTES" (which claims priority of European Patent Applications Nos. 07109470.0 of Jun. 1, 2007 and 07110633.0 of Jun. 20, 2007) in the name of the present Applicant.

BACKGROUND OF THE INVENTION

Reference is made herein to the discussion of the prior art made in the above-identified International Application No. WO 2008/146262 A2 and to the entire disclosure thereof. All the general principles discussed in International Application No. WO 2008/146262 A2 apply equally to the present invention. The content of International Application No. WO 2008/146262 A2 is thereby incorporated by reference in its entirety.

The present invention was especially made with a view to further improve the invention disclosed in International Application No. WO 2008/146262 A2.

SUMMARY OF THE INVENTION

A general aim of the invention is therefore to further improve the methods, uses and devices disclosed in International Application No. WO 2008/146262 A2.

More precisely, an aim of the present invention is to provide an improved method for checking the authenticity of security documents, in particular banknotes, which is more robust and can efficiently discriminate features printed, applied or otherwise provided on the security documents.

In particular, the present invention is aimed at improving the discrimination between intaglio-printed textures and medium- or high-quality commercial offset printed textures.

Yet another aim of the present invention is to provide such a method that can be conveniently and efficiently implemented in a portable device.

These aims, and others, are achieved thanks to the solutions defined in the appended claims.

There is accordingly provided a method for checking the authenticity of security documents, in particular banknotes, wherein authentic security documents comprise security features printed, applied or otherwise provided on the security documents, which security features comprise characteristic visual features intrinsic to the processes used for producing the security documents, the method comprising the step of digitally processing a sample image of at least one region of interest of the surface of a candidate document to be authenticated, which region of interest encompasses at least part of the security features, the digital processing including performing a decomposition of the sample image by means of wavelet transform (WT) of the sample image. According the invention, the decomposition of the sample image is based on a wavelet packet transform (WPT) of the sample image.

According to an advantageous embodiment of the invention, the wavelet packet transform (WPT) is a two-dimensional shift-invariant wavelet packet transform (2D-SIWPT), and is preferably based on an incomplete wavelet packet transform.

In this latter case, decomposition of the sample image can include decomposition of the sample image into a wavelet packet tree comprising at least one approximation node and detail nodes, and looking for the detail node within the wavelet packet tree that has the highest information content. Such determination is advantageously based on a so-called best branch algorithm (BBA).

There is also provided a method for producing security documents in accordance with claim 14, as well as a digital signal processing unit in accordance with claim 16 and a device for checking the authenticity of security documents in accordance with claim 18. Such device can advantageously be implemented as a portable electronic device with integrated image-acquisition capability such as a smart phone.

Also claimed is the use of wavelet packet transform (WPT) for the authentication of security documents, in particular banknotes.

There is also provided a method for detecting security features printed, applied or otherwise provided on security documents, in particular banknotes, which security features comprise characteristic visual features intrinsic to the processes used for producing the security documents, the method comprising the step of digitally processing a sample image of at least one region of interest of the surface of a candidate document, which region of interest is selected to include at least a portion of the security features, the digital processing including performing a decomposition of the sample image by means of wavelet transform (WT) of the sample image. The decomposition of the sample image is similarly based on a wavelet packet transform (WPT) of the sample image.

Advantageous embodiments of the above solutions form the subject-matter of the dependent claims.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

The background of the present invention stems from the observation that security features printed, applied or otherwise provided on security documents using the specific production processes that are only available to the security printer, in particular intaglio-printed features, exhibit highly characteristic visual features (hereinafter referred to as "intrinsic features") that are recognizable by a qualified person having knowledge about the specific production processes involved.

The following discussion will focus on the analysis of intrinsic features produced by intaglio printing. It shall however be appreciated that the same approach is applicable to other intrinsic features of banknotes, in particular line offset-printed features, letterpress-printed features and/or optically-diffractive structures. The results of the tests which have been carried out by the Applicant have shown that intaglio-printed features are very well suited for the purpose of authentication according to the invention and furthermore give the best results. This is especially due to the fact that intaglio printing enables the printing of very fine, high resolution and sharply-defined patterns. Intaglio printing is therefore a preferred process for producing the intrinsic features that are exploited in the context of the present invention.

Figure 1A:
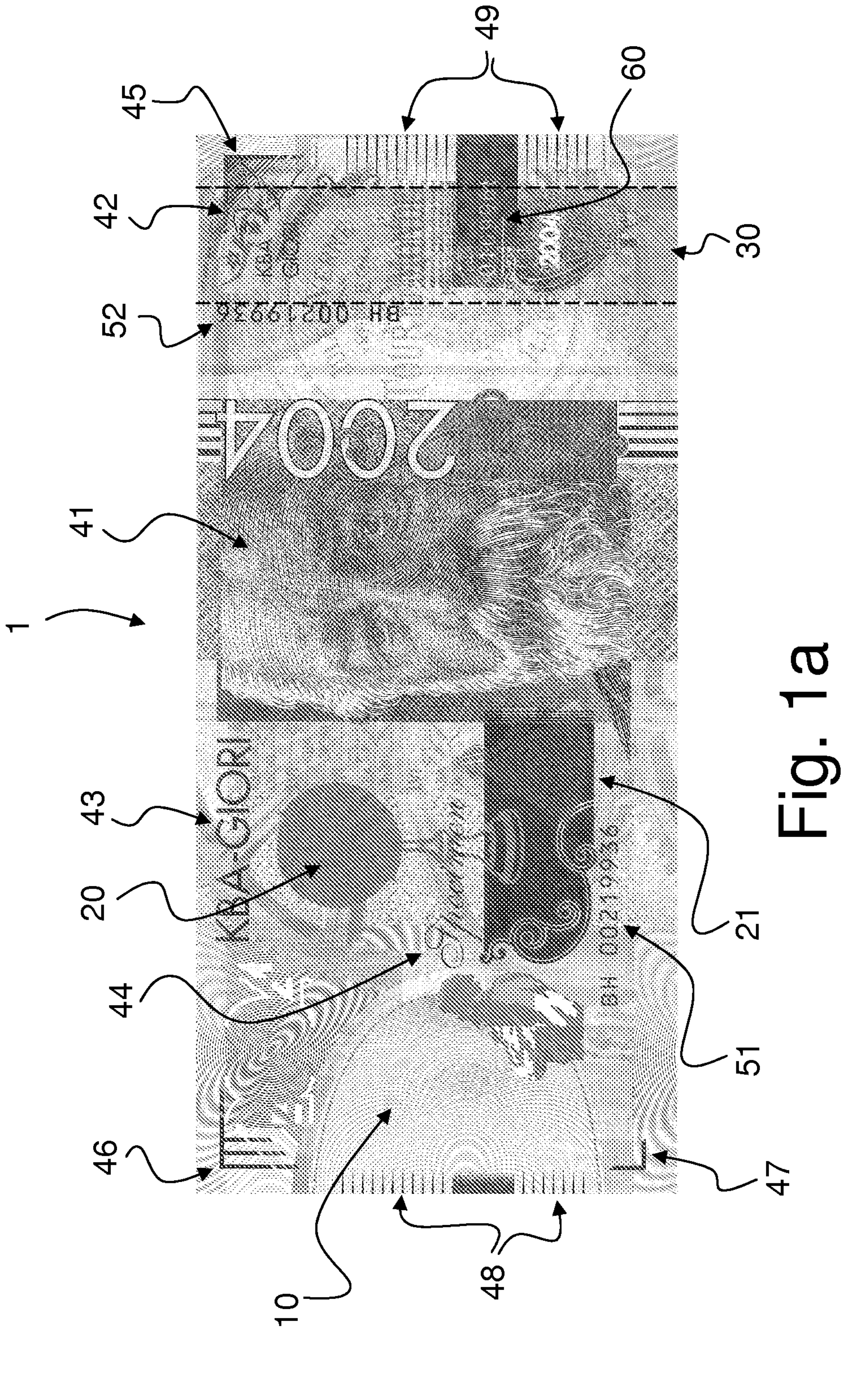
FIG. 1*a* is a greyscale scan of an exemplary banknote specimen.

FIG. 1*a* is a greyscale scan of an illustrative banknote specimen 1 showing the portrait of Jules Verne which was produced during the year 2004 by the present Applicant. This banknote specimen 1 was produced using a combination of printing and processing techniques specific to banknote production, including in particular line offset printing for printing the multicolour background 10 of the note, silk-screen printing for printing optically-variable ink patterns, including motifs of a planisphere 20 and of a sextant 21, foil stamping techniques for applying optically-variables devices, including a strip of material 30 carrying optically-diffractive structures extending vertically along the height of the banknote (which strip 30 is schematically delimited by two dashed lines in FIG. 1*a*), intaglio printing for printing several intaglio patterns 41 to 49, including the portrait 41 of Jules Verne, letterpress printing for printing two serial numbers 51, 52, and varnishing for varnishing the note with a layer of protective varnish. This banknote specimen 1 is also provided with a marking 60 on the right-hand side of the specimen, which marking 60 is applied by partial laser ablation of the strip 30 and of an underlying layer of offset-printed ink (not referenced). In the illustrated example, the portrait 41 (together with the vertical year designation 2004 and the pictorial motifs surrounding the portrait), a logo of "KBA-GIORI" with the Pegasus 42, indications "KBA-GIORI" 43 and "Specimen" 44, and tactile patterns 45 to 49 on three corners of the note and on the right-hand side and left-hand side of the note were printed by intaglio printing on top of the line offset background 10, the silk-screen-printed motifs 20, 21 and the strip of material 30. The serial numbers 51, 52 were printed and the varnishing was performed following the intaglio printing phase. It shall further be understood that the banknote specimen 1 was produced on sheet-fed printing and processing equipment (as supplied by the present Applicant), each printed sheet carrying an array of multiple banknote specimens (as is usual in the art) that were ultimately cut into individual notes at the end of the production process.

Figure 1B:
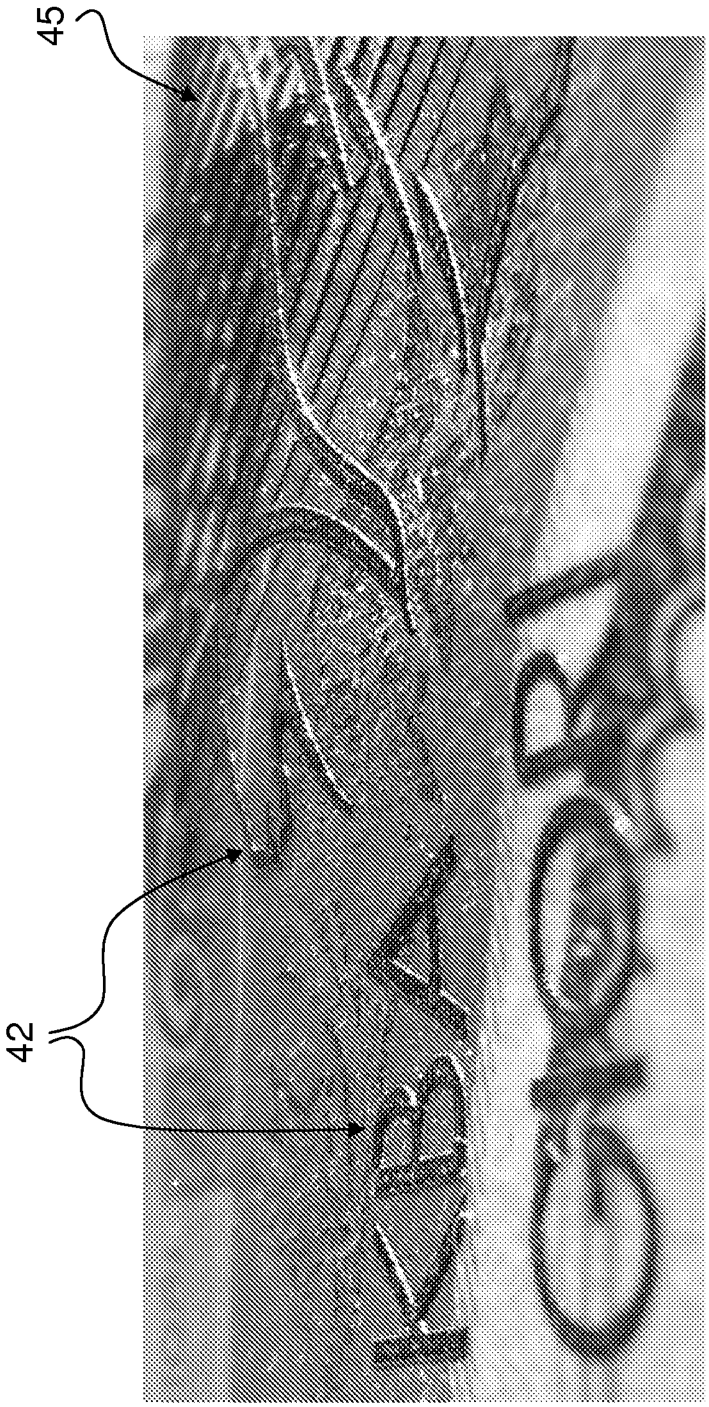
FIG. 1*b* is a greyscale photograph of part of the upper right corner of the banknote specimen of FIG. 1*a;*

FIG. 1*b* is a greyscale photograph of the upper right corner of the banknote specimen of FIG. 1*a* showing in greater detail the intaglio-printed logo of "KBA-GIORI" with the Pegasus 42 and tactile pattern 45 which comprises a set of parallel lines at forty-five degrees partly overlapping with the Pegasus 42. The characteristic embossing and relief effect of the intaglio printing as well as the sharpness of the print can clearly be seen in this photograph.

Figure 2A:
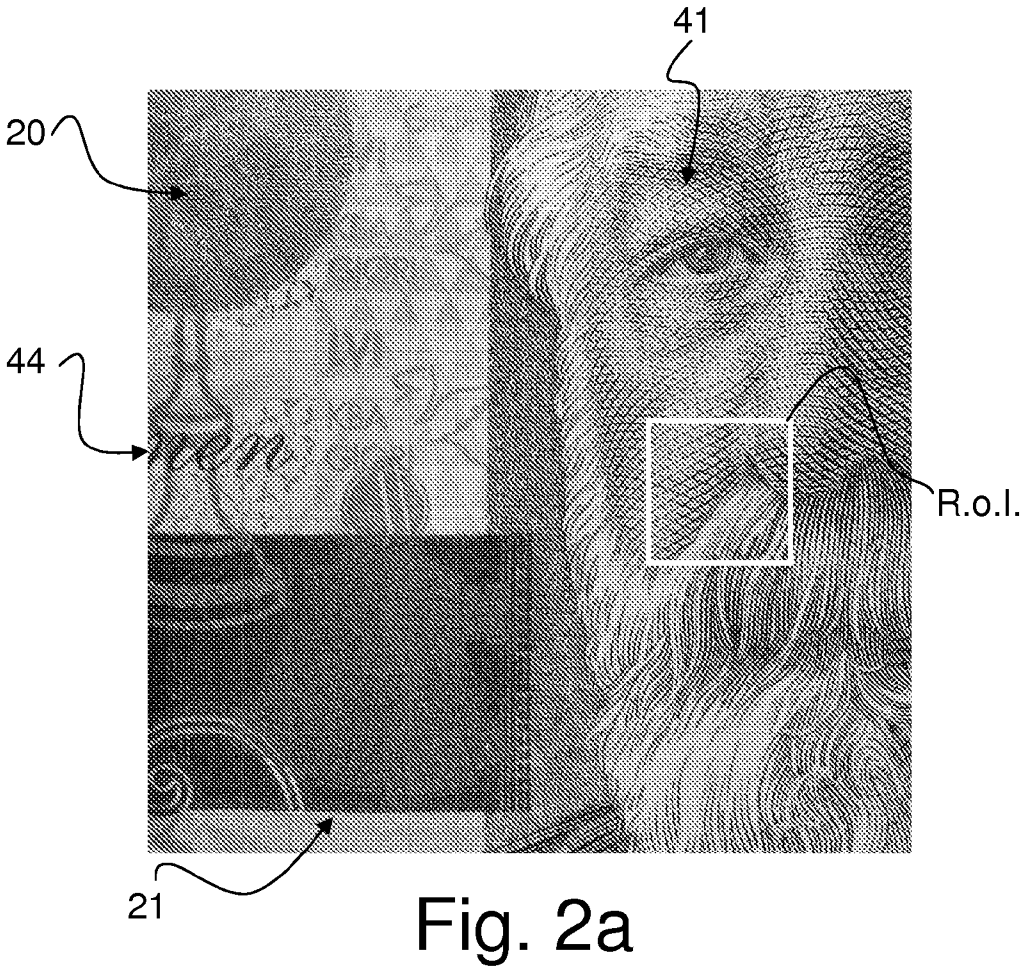
FIGS. 2*a* and 2*b* are enlarged views of the banknote specimen of FIG. 1*a*, FIG. 2*b* corresponding to the area indicated by a white square in FIG. 2*a;*
Figure 2B:
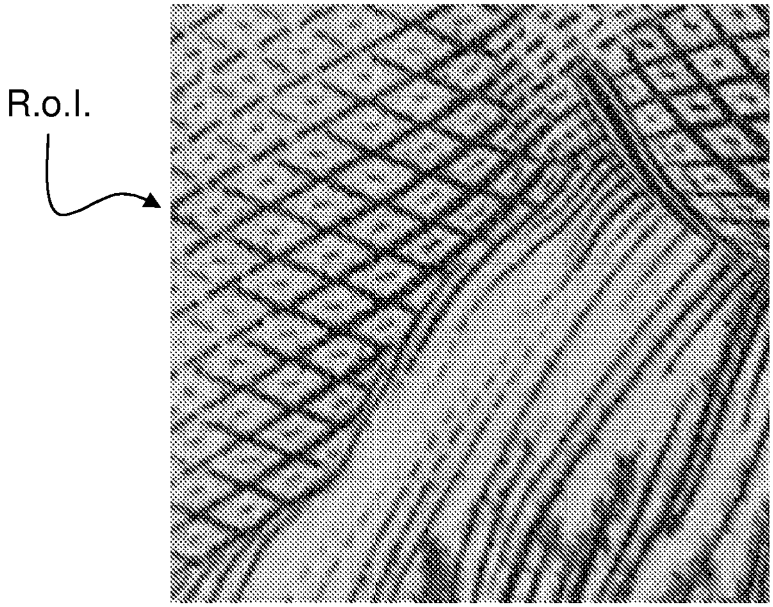

FIG. 2*a* is a more detailed view of a left-hand side portion of the portrait 41 of FIG. 1*a* (patterns 20, 21 and 44 being also partly visible in FIG. 2*a*). FIG. 2*b* is an enlarged view of a square portion (or region of interest R.o.I.) of the portrait 41, which square portion is illustrated by a white square in FIG. 2*a*. FIG. 2*b* shows some of the characteristic intrinsic features of the intaglio patterns constituting the portrait 41. The region of interest R.o.I. used for subsequent signal processing does not need to cover a large surface area of the document. Rather, tests have shown that a surface area of less than 5 $cm^2$ is already sufficient for the purpose of the authentication.

FIGS. 3*a*, 3*b* and 4*a*, 4*b* are greyscale images similar to FIGS. 2*a*, 2*b* of two colour copies of the banknote specimen shown in FIG. 1*a*, which copies were produced using commercial colour copying equipment. In each of FIGS. 3*a* and 4*a*, the depicted white square indicates the corresponding region of interest R.o.I. of the portrait which is shown in enlarged view in FIGS. 3*b* and 4*b*, respectively. The first colour copy illustrated in FIGS. 3*a*, 3*b* was produced using an Epson ink-jet printer and Epson photo-paper. The second colour copy illustrated in FIGS. 4*a*, 4*b* was produced using a Canon ink-jet printer and normal paper. A high-resolution scanner was used to scan the original specimen and provide the necessary input for the ink-jet printers.

Figure 3A:
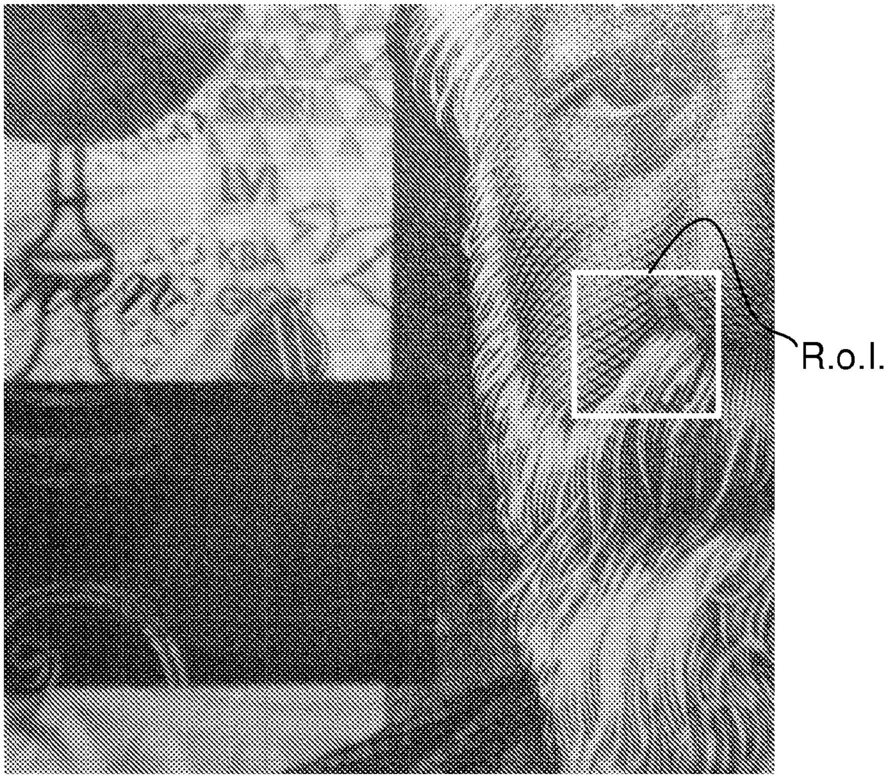
FIGS. 3*a* and 3*b* are enlarged views of a first colour copy of the banknote specimen of FIG. 1*a*, FIG. 3*b* corresponding to the area indicated by a white square in FIG. 3*a;*
Figure 3B:
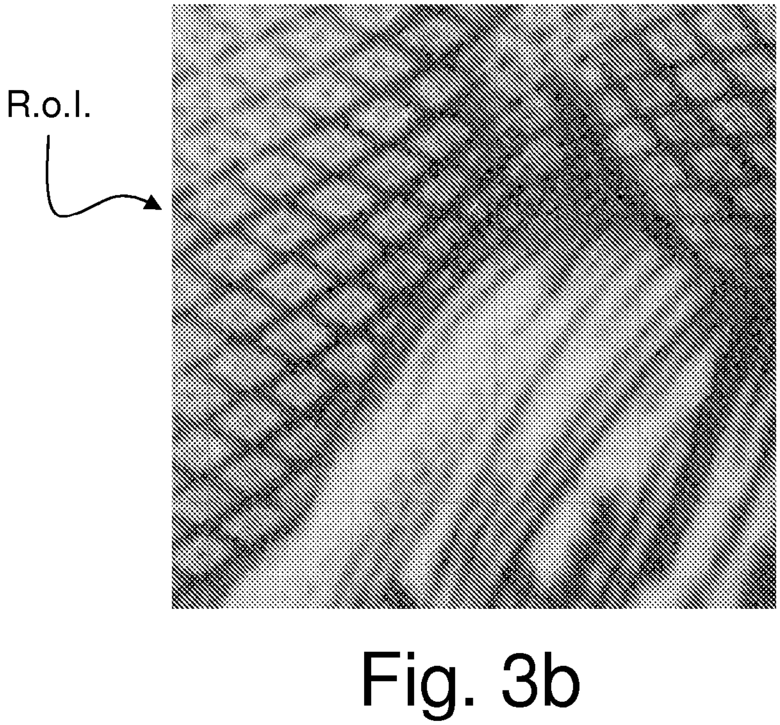
Figure 4A:
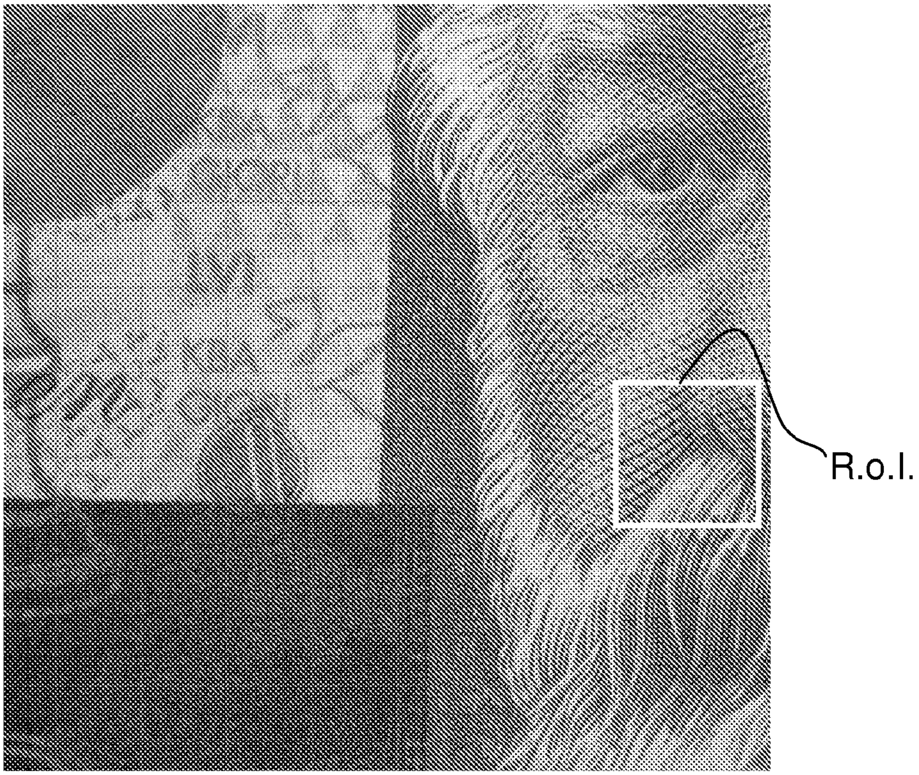
FIGS. 4*a* and 4*b* are enlarged views of a second colour copy of the banknote specimen of FIG. 1*a*, FIG. 4*b* corresponding to the area indicated by a white square in FIG. 4*a;*
Figure 4B:
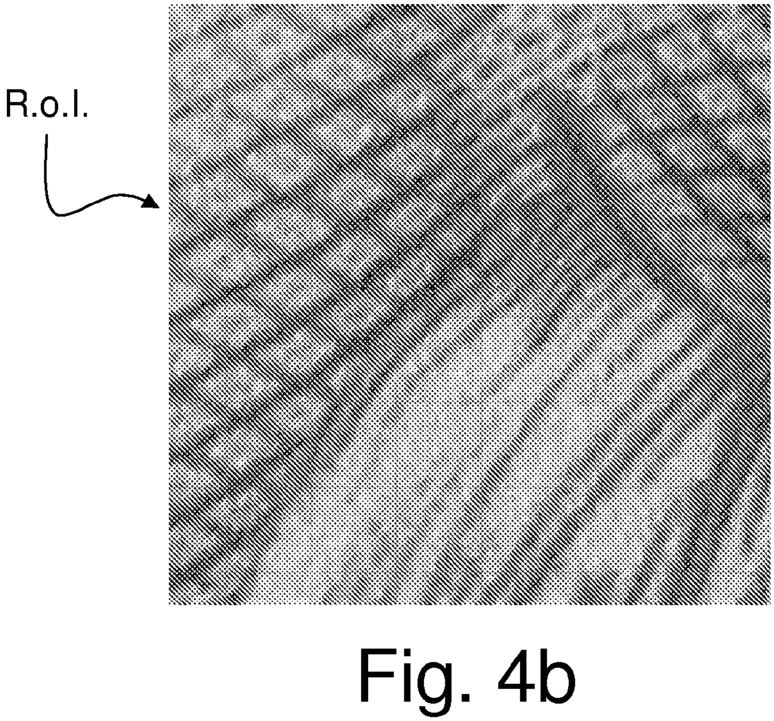

While the general visual aspect of both colour copies looks similar to the original specimen, a closer look at the structures of the copied intaglio pattern forming the portrait, as illustrated in FIGS. 3*b* and 4*b*, shows that the structures are not as sharply defined as in the original specimen (see FIG. 2*b*) and that these structures appear to be somewhat blurred and smoothed as a result of the ink-jet printing process and the nature of the paper used. The image information contained in FIGS. 3*b* and 4*b* is clearly different from that of the original specimen illustrated in FIG. 2*b*. The invention described in International application No. WO 2008/146262 A2 concerns a method defining how this difference can be brought forward and exploited in order to differentiate between the original and authentic specimen of FIGS. 2*a*, 2*b* and the copies of FIGS. 3*a*, 3*b* and 4*a*, 4*b*. The below discussion will deal with an improvement of this previous method.

As hinted above, an intrinsic and characteristic feature of intaglio-printed patterns is in particular the high sharpness of the print, whereas the ink-jet-printed copies exhibit a substantially lower sharpness of print due in particular to the digital processing and printing. The same can be said of colour-laser-printed copies, as well as of copies obtained by thermo-sublimation processes. This difference can be brought forward by performing a decomposition of the image data contained in an enlarged view (or region of interest) of the candidate document to be authenticated, such as the views of FIGS. 2*b*, 3*b* and 4*b*, by performing a decomposition of the sample image by means of a wavelet transform (WT), and extracting representative classifying data from such decomposition. The general principle of wavelet transform (WT) as applied for the purpose of checking the authenticity of security documents is extensively discussed in International application No. WO 2008/146262 A2, the content of which is incorporated herein by reference in its entirety.

A wavelet is a mathematical function used to divide a given function or signal into different scale components. A wavelet transformation (or Wavelet Transform—hereinafter "WT") is the representation of the function or signal by wavelets. WTs have advantages over traditional Fourier transforms for representing functions and signals that have discontinuities and sharp peaks.

It shall be appreciated that Fourier transform is not to be assimilated to WT. Indeed, Fourier transform merely involves the transformation of the processed image into a spectrum indicative of the relevant spatial frequency content of the image, without any distinction as regards scale.

Wavelet theory will not be discussed in depth in the present description as this theory is as such well-known in the art and is extensively discussed and described in several textbooks on the subject. The interested reader may for instance refer to [Mallat1989] and [Unser1995] (see the list of references at the end of the present description). The pyramid structured WT discussed in [Mallat1989] and the shift invariant WT discussed in [Unser1995] decompose successively the low frequency scales. However, a large class of textures has its dominant frequencies at the middle frequency scales.

To overcome this drawback, the present invention makes use of so-called Wavelet Packet Transform (hereinafter "WPT") which is known as such in the art (see for instance [Chang1993]). The use of WPT in the particular context of the present invention constitutes an improvement over the invention disclosed in WO 2008/146262 A2 as this will be discussed in the following.

As discussed above, security prints like banknotes are mainly produced by line offset, letterpress printing, foil application, and intaglio printing. Especially the latter technique plays a major role in banknote reliability (see [Dyck2008]). The term "intaglio" is of Italian origin and means "to engrave". The printing method of the same name uses a metal plate with engraved characters and structures. During the printing process the engraved structures are filled with ink and pressed under huge pressure (tens of tons per inch) directly on the paper (see [vanRenesse2005]). A tactile relief and fine lines are formed, unique to intaglio printing process and almost impossible to reproduce via commercial printing methods (see [Schaede2006]). Since intaglio process is used to produce the currencies of the world, intaglio printing presses and the companies who own them are monitored by government agencies.

In terms of signal processing, the fine structures of intaglio technique can be considered as textures with certain ranges of spatial frequencies. Therefore, it should be possible to detect them with WPT. For this purpose a new feature extraction algorithm preferably based on incomplete WPT (see [Jiang2003]) is proposed. It belongs to the top-down approaches and can be applied to redundant shift invariant and shift invariant WPT. The algorithm decomposes the so-called Wavelet Packet Tree according to a criterion which is based on first order statistical moments of wavelet coefficients.

The WPT is a generalization of the classical WT which means that not only the approximation (low frequency parts) but also the details (high frequency parts) of a signal are decomposed (see [Zhang2002]). This results in a tree-structured WPT as shown schematically in FIG. 5, and decomposition of the above mentioned richer resolution of middle and high spatial frequency scales which are not decomposed in the classical WT. Due to its tree characteristic the frequency scales are called nodes or subimages. In each decomposition level all leaf nodes are decomposed in one approximation node $A_{i,j}$ and three detail nodes $cV_{i,j}$, $cH_{i,j}$, and $cD_{i,j}$. $cV_{i,j}$ represents the vertical details, $cH_{i,j}$ the horizontal details, and $cD_{i,j}$ the diagonal details, where i is the decomposition level and j the node number.

Figure 5:
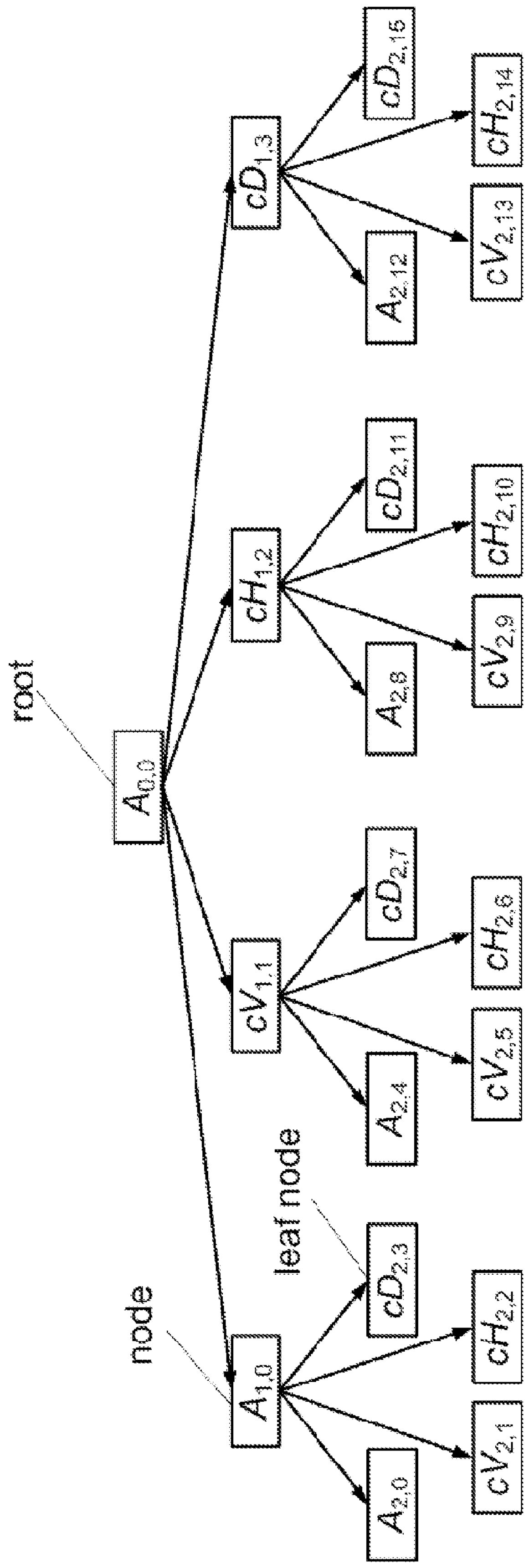
FIG. 5 is a schematic illustration of a two-dimensional tree-structured Wavelet Packet Transform ("WPT") with three tree levels (two decomposition levels)

As shown in FIG. 5 which shows a two-dimensional tree-structured Wavelet Packet Transform with three tree levels, the original image, or "root", $A_{0,0}$ is decomposed in (i=1, first decomposition level, second tree level after the root) an approximation node $A_{1,0}$ (j=0, first node) and three detail nodes $cV_{1,1}$ (j=1, second node), $cH_{1,2}$(j=2, third node), and $cD_{1,3}$(j=3, fourth node). Then each node $A_{1,0}$, $cV_{1,1}$, $cH_{1,2}$, and $cD_{1,3}$ of the second tree level is further decomposed (i=2, second decomposition level, third tree level) in sixteen nodes (j=0 to 15) $A_{2,0}$, $cV_{2,1}$, $cH_{2,2}$, $cD_{2,3}$, $A_{2,4}$, $cV_{2,5}$, $cH_{2,6}$, $cD_{2,7}$, $A_{2,8}$, $cV_{2,9}$, $cH_{2,10}$, $cD_{2,11}$, $A_{2,12}$, $cV_{2,13}$, $cH_{2,14}$, and $cD_{2,15}$.

The majority of existing texture analysis methods based on two-dimensional WPT makes the explicit or implicit assumption that textured images are acquired from the same viewpoint (see [Coifman1992]). In many practical applications it is all but impossible to ensure this limitation. Therefore, shift invariant WPTs are highly desirable. In the traditional implementation of the two-dimensional WPT signals are first convoluted by wavelet filters and then downsampled. The length of the decomposed signal is $\frac{1}{4^i}$ times the original signal, where i is again the decomposition level. The downsampling results in a shift variant signal representation as discussed in [Mallat1989]. The alternative approach described by [Shensa1992] yields to a shift invariant transform by omitting the downsampling in each level. The great burden of this method is the high computational effort because of the highly redundant signal representation. In consideration of these disadvantages, a one-dimensional shift invariant WPT (or "SIWPT") was proposed. It is based on the fact that an arbitrary signal translation of Δ samples is bounded by mod (Δ,2) (where mod (x,y) designates the so-called modulo function) because of the downsampling in each decomposition level. Therefore, a shift invariant representation can be achieved by the decomposition of a nonshifted version, defined by equations [1] and [2] below and a one-pixel-shifted version, defined by equations [3] and [4] below, of the approximation and detail nodes.

$$d_{i+1,2j}[k] = \sum_n h[n] d_{i,j}[n+2k], \tag{1}$$

$$d_{i+1,2j+1}[k] = \sum_n g[n] d_{i,j}[n+2k], \tag{2}$$

$$d_{i+1,2j+2^{2i-1}}[k] = \sum_n h[n] d_{i,j}[n+2k+1], \tag{3}$$

$$d_{i+1,2j+1+2^{2i-1}}[k] = \sum_n g[n] d_{i,j}[n+2k+1], \tag{4}$$

Both versions are downsampled and convulated by arbitrary wavelet filters g[n] and h[n]. h[n] is a lowpass and g[n] is a highpass wavelet filter, respectively (see [Mallat1989] and [Daubechies1992]).

Figure 6:
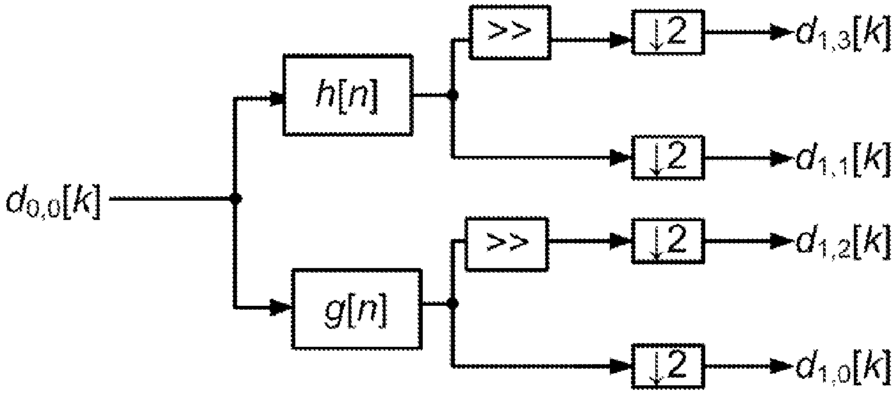
FIG. 6 is a schematic illustration of a one-dimensional Shift Invariant Wavelet Packet Transform ("SIWPT") implemented as a filter bank.

The version with the larger information content is identified on the basis of an information content criterion (which will be discussed hereinafter) and further decomposed whereas the other version is upcast. The upcasting yields to a nonredundant representation and to a fast execution time. The implementation of a one-dimensional SIWPT as filter bank is illustrated in FIG. 6. As mentioned, in each tree level a non-shifted and a one-pixel-shifted version is decomposed and downsampled. On the basis of an information content criterion, one version is decomposed further, whereas the other version is discarded.

The above-mentioned method was exclusively defined for one-dimensional signals. In the context of the present invention, the SIWPT has been modified for two-dimensional signals such as images. The resulting two-dimensional SIWPT (or "2D-SIWPT") first decomposes four different shifted versions of the relevant node. Based on the resulting information content, three out of the four versions are discarded, whereas the version with the highest information content is further decomposed. According to experiments which were carried out, there is no difference is feature stability and quality between the shift invariant WPTs.

As discussed above, the WPT enables an entire characterization of textures in all frequency scales. However, with increasing decomposition level, the number of nodes (or subimages) grows exponentially. This lowers the execution time considerably and a methodology has thus been devised to concentrate on the most relevant node only.

For texture analysis it is usually unnecessary to achieve a complete Wavelet Packet Tree decomposition. Instead it is more important to focus on nodes which provide the best spatial frequency resolution and the largest information content, respectively. Therefore, according to a preferred embodiment of the invention, the WPT is decomposed according to an information content criterion, resulting in an incomplete WPT. Most known methods like [Chang1993], [Jiang2003], [Coifman1992], [Saito1994], [Wang2008] and [Wang2000] use the entropy or the average energy of an image for this purpose. [Choi2006] applies the WT with first order statistics to classify different denominations of banknotes.

From a global point of view textures printed by the aforementioned printing processes are barely distinguishable. Entropy or energy based methods are designed to separate different textures and cannot discriminate them with satisfactory results. A different approach is thus necessary. Diverse printed textures are different in their gray-scale transitions and discontinuities, respectively. In particular the discontinuities of intaglio printed textures are more pronounced compared to those of commercial prints. This difference can be determined by the variance and the excess of the wavelet coefficients as discussed in International application No. WO 2008/146262 A2.

Figure 7:
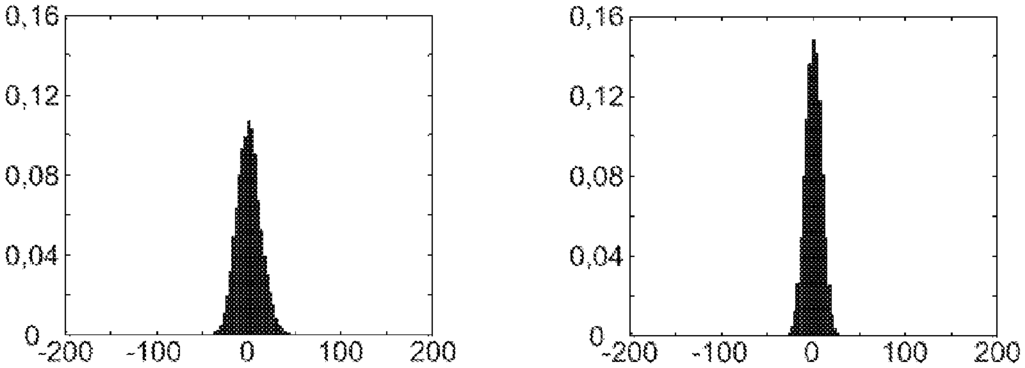
FIG. 7 shows the normalized histograms of wavelet coefficients of an intaglio (left) and a commercial (right) printed texture after a one-level 2D-SIWPT according to the invention.

FIG. 7 shows the normalized histograms of wavelet coefficients of an intaglio (left) and a commercial (right) printed texture after a one-level 2D-SIWPT according to the invention (see also FIGS. 12 to 20 and the related description in International application No. WO 2008/146262 A2). The highly discontinuous structure of intaglio printing yields to a weighting on middle and high wavelet coefficients, whereas the histogram of commercial printing is narrowly distributed and weighted on small coefficients. The best separation between different printing techniques can be reached in this particular case, if the tree is decomposed towards variance and excess, until the subimage contrast is maximized. It can then be assumed that the relevant subimage represent the texture in the best possible way.

In consideration of production tolerances and the digitization process, textures could be influenced by additive noise. Taking into account, that noise is represented by small wavelet coefficients (see [Fowler2005]), the histograms of noisy textures are widely distributed.

Both aforementioned properties lead to a three-stage stopping criterion 1. to 3.:

1. If the variance drops during decomposition, the subimage will be lower in contrast; the decomposition should thus be stopped;
2. If the variance grows at least to the same degree as the excess drops, the small wavelet coefficients of the previous level will become larger; thus the subimages are less noisy and should be decomposed further; this criterion can be formulated as equation [5] below:

$$\frac{\sigma_{i-1}^2 - \sigma_i^2}{\sigma_{i-1}^2} \geq \frac{C_{i-1} - C_i}{C_{i-1}} \quad [5]$$

3. If both the variance and excess grow during decomposition, the contrast of the subimages will be enhanced; therefore the tree should be decomposed further.

Furthermore, if the size of a subimage is smaller than the empirically determined value of 16×16 coefficients, variance and excess may vary widely from sample to sample. As a consequence, features could get unstable (see [Chang1993]). Hence, this subimage size should preferably be used as an overall stopping criterion.

A novel algorithmic concept based on the aforementioned information content and stopping criteria will now be presented. Such concept is based on the assumption that only the tree branch which provides the best spatial frequency resolution is important for texture analysis. The following examination of tree properties leads to a so-called Best Branch Algorithm (BBA).

The detail nodes, as the name suggests, contain the specific or detailed characteristics of a texture. Therefore, even if the textures are akin, they could be discriminated by this information. The approximation nodes of the most left tree branch, the so-called approximation branch, contain only the low frequency information. Therefore, it is nearly impossible to distinguish different printing techniques with the information content of the approximation branch and such approximation branch should therefore not be used for feature extraction. Theoretically their children, which represent the lower part of the middle frequency scales, could yield the best spatial frequency resolution. This information could not be directly extracted out of the approximation nodes. For this reason the approximation nodes have to be decomposed as long as their children give the best spatial frequency resolution of the whole tree. To speed up the execution time, it is advantageous to concentrate on the detail branch with the best spatial frequency resolution and the approximation branch as long as its children support better information than the best detail branch. For the evaluation of the detail branch of the next decomposition level the node with the highest information content of the current level, the so-called best node, has to be investigated. Since the excess of subimages at the same tree level is almost equal, the best detail node can be determined by the highest variance.

The following table summarizes a possible implementation of the Best Branch Algorithm:

Algorithm 1 Best Branch Algorithm

```
Require: mod(M×M, 2) = 0
  finished ← false
  i ← 1
  A_{i,0}, cV_{i,1}, cH_{i,2}, cD_{i,3} ← 2D-SIWPT(A_{i−1,0})
  while (i ≤log_2(M×M=16×16) and ¬ (finished) ) do
    cB_i (max(σ(A_{i,0}, cV_{i,1},...,cD_{i,7})) {determine the best detail node cB_i}
    if cB_i ⊂ A_{i−1,0} then
      {best node is part of the approximation branch}
      delete A_{i,4}, cV_{i,5}, cH_{i,6}, cD_{i,7}
      j ← 0
    else
      {best node is part of the detail branch}
      delete A_{i,0}, cV_{i,1}, cH_{i,2}, cD_{i,3}
      j ← 4
    end if
    σ^2_i ← σ^2_{cVi,j+1} + σ^2_{cHi,j+2} +σ^2_{cDi,j+3}
    C_i ← C_{cVi,j+1} + C_{cHi,j+2} + C_{cDi,j+3}
    if σ^2_{i−1}> σ^2_i then
      finished ← true
      {best spatial frequency resolution has been reached}
    else if C_{i−1} > C_i then
      if ¬ ( Eq. [5]) then
        finished ← true
        {best spatial frequency resolution has been reached}
      else
        increment i
        if cB_{i−1} ⊂ A_{i−2,0} then
          A_{i,0}, cV_{i,1}, cH_{i,2}, cD_{i,3} ← 2D-SIWPT(A_{i−1,0})
          A_{i,4}, cV_{i,5}, cH_{i,6}, cD_{i,7} ← 2D-SIWPT(cB_{i−1})
        else
          A_{i,4}, cV_{i,5}, cH_{i,6}, cD_{i,7} ← 2D-SIWPT(cB_{i−1})
        end if
      end if
  end while
{C_{i−1} and σ^2_{i−1} represent the texture best possible}
```

Figure 8:
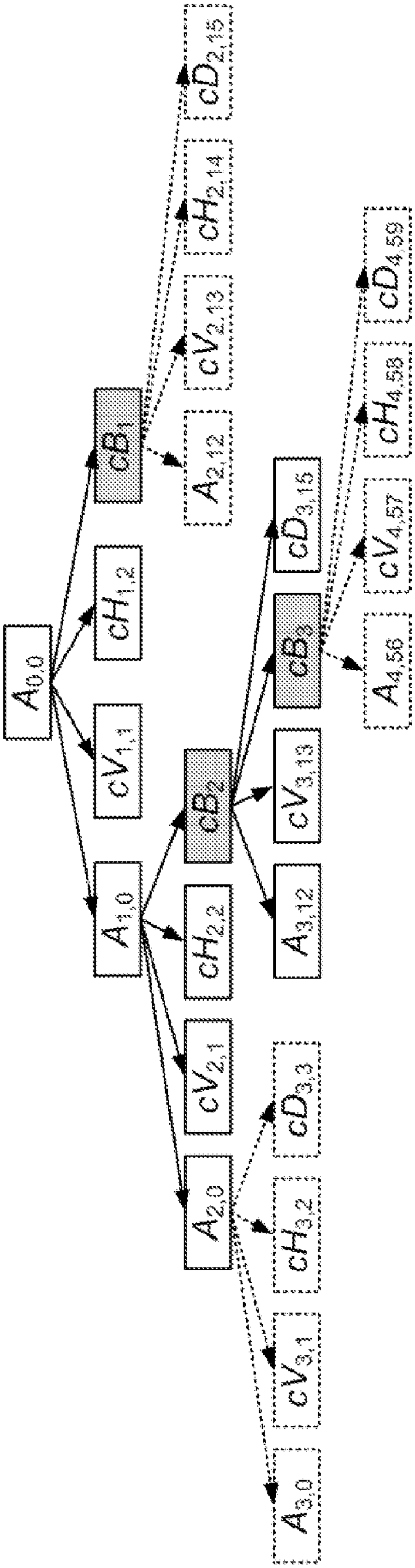
FIG. 8 shows an incomplete Wavelet Packet Tree decomposed according to a Best Branch Algorithm (BBA) in accordance with a preferred embodiment of the invention.

FIG. 8 schematically shows an illustration of an incomplete Wavelet Packet Tree which has been decomposed using the above Brest Branch Algorithm. The highlighted nodes are identified to be the best nodes ($cB_1$, $cB_2$, $cB_3$) of their corresponding decomposition level and the dashed nodes are those which have been discarded during decomposition. The detail branch of the third decomposition level characterizes the texture almost optimally.

In the illustration of FIG. 8, it will thus be understood that the best node $cB_1$ of the first decomposition level (i=1) is determined in this illustrative example as being the node containing the diagonal details ($cD_{1,3}$), i.e. the node exhibiting the highest variance compared to the other detail nodes ($cH_{1,1}$, and $cH_{1,2}$) of the same decomposition level.

In the next decomposition level (i=2), only the approximation node $A_{1,0}$ and the best node $cB_2$ of the first decomposition level are further decomposed to determine which node leads to the best information content. As illustrated in the example of FIG. 8, further decomposition of the approximation node $A_{1,0}$ leads to identification of the best node $cB_2$ for the second decomposition level.

In this example, the best node $cB_2$ of the second decomposition level (i=2) is determined in this illustrative example as being the node $cD_{2,3}$ containing the diagonal details resulting from further decomposition of the approximation node $A_{1,0}$, i.e. the node exhibiting the highest variance compared to the other detail nodes ($cV_{2,1}$, $cH_{2,2}$, $cV_{2,3}$, $cH_{2,4}$, and $cD_{2,5}$) of the same decomposition level. In this example, further decomposition of the previously found best node $cB_1$ (i.e. detail node $cD_{1,3}$) accordingly leads to decomposition into nodes $A_{2,12}$, $cV_{2,13}$, $cH_{2,14}$, and $cD_{2,15}$ that are subsequently discarded as shown in dashed lines.

In the following decomposition level (i=3), only the approximation node $A_{2,0}$ and the best node $cB_2$ of the second decomposition level are further decomposed to similarly determine which node leads to the best information content. In this case, the best node $cB_3$ of the third decomposition level (i=3) is identified to be the detail node $cH_{3,14}$ containing the horizontal details resulting from further decomposition of the previous best node $cB_2$, i.e. the node exhibiting the highest variance compared to the other detail nodes ($cV_{3,1}$, $cH_{3,2}$, $cD_{3,3}$, $cV_{3,3}$, and $cD_{3,5}$) of the same decomposition level. In this example, further decomposition of the approximation node $A_{2,0}$ accordingly leads to decomposition into nodes $A_{3,0}$, $cV_{3,1}$, $cH_{3,2}$, and $cD_{3,3}$ which are subsequently discarded as shown in dashed lines.

FIG. 8 shows that further decomposition of the best node $cB_3$ of the third decomposition level does not lead to a more optimal representation of the feature and decomposition is accordingly stopped. As a result, the detail branch of the third level is selected for feature extraction.

Figure 9:
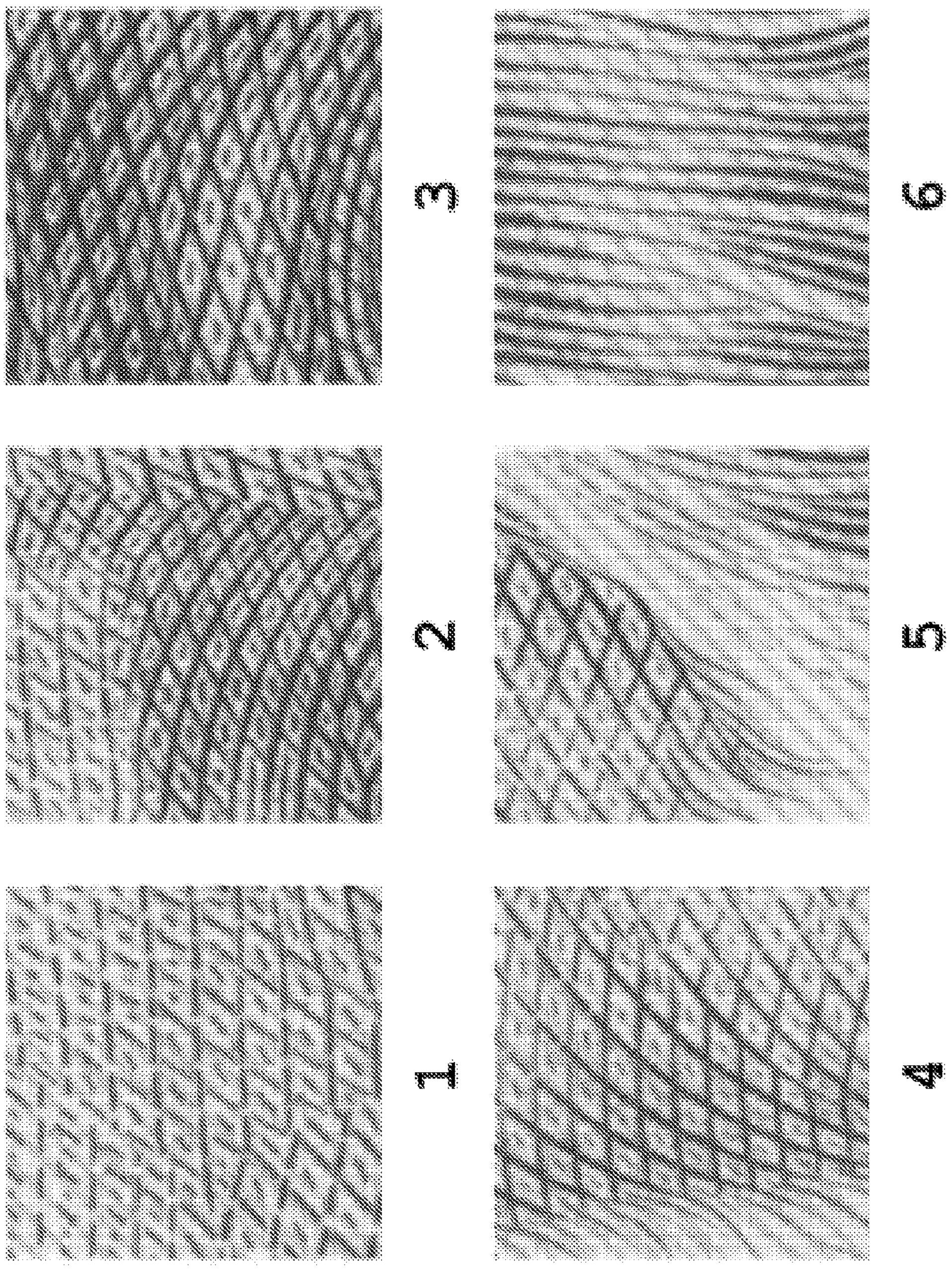
FIG. 9 illustrates six different printed textures that are characteristic of intaglio printing and that have been used as a basis to constitute a set of experiment samples.

Experiments have been carried out and investigated with a set of 900 textures fabricated by the Applicant. One part of the set was produced by intaglio printing as used for the production of security documents, especially banknotes. The other part of the set was produced by commercial offset printing as used among others for newspaper printing. This other part can be further divided into high-quality and medium quality prints, the medium quality prints being affected by additive noise. Both the high-quality and medium-quality commercial printed textures are barely distinguishably by an untrained human eye from the intaglio-printed textures. The textures are translated and/or rotated by a few pixels owing to production tolerances. They have been scanned with a resolution of 1200 dpi and have been converted to gray scale images. The set consists of six different textures with an image size of 256×256 pixels as illustrated in FIG. 9. As shown in FIG. 9, the textures differ in contrast, latitude of gray-scale transitions and structure. They are illustrative of the most common security printing structures produced by intaglio printing.

All textures 1 to 6 illustrated in FIG. 9 have been decomposed by the aforementioned two-dimensional Shift Invariant Wavelet Packet Transform (2D-SIWPT) using the so-called Daubechies 2 tap wavelet (or db2—see [Daubechies1992]) and by adopting the above-discussed Best Branch Algorithm (BBA).

Figure 10:
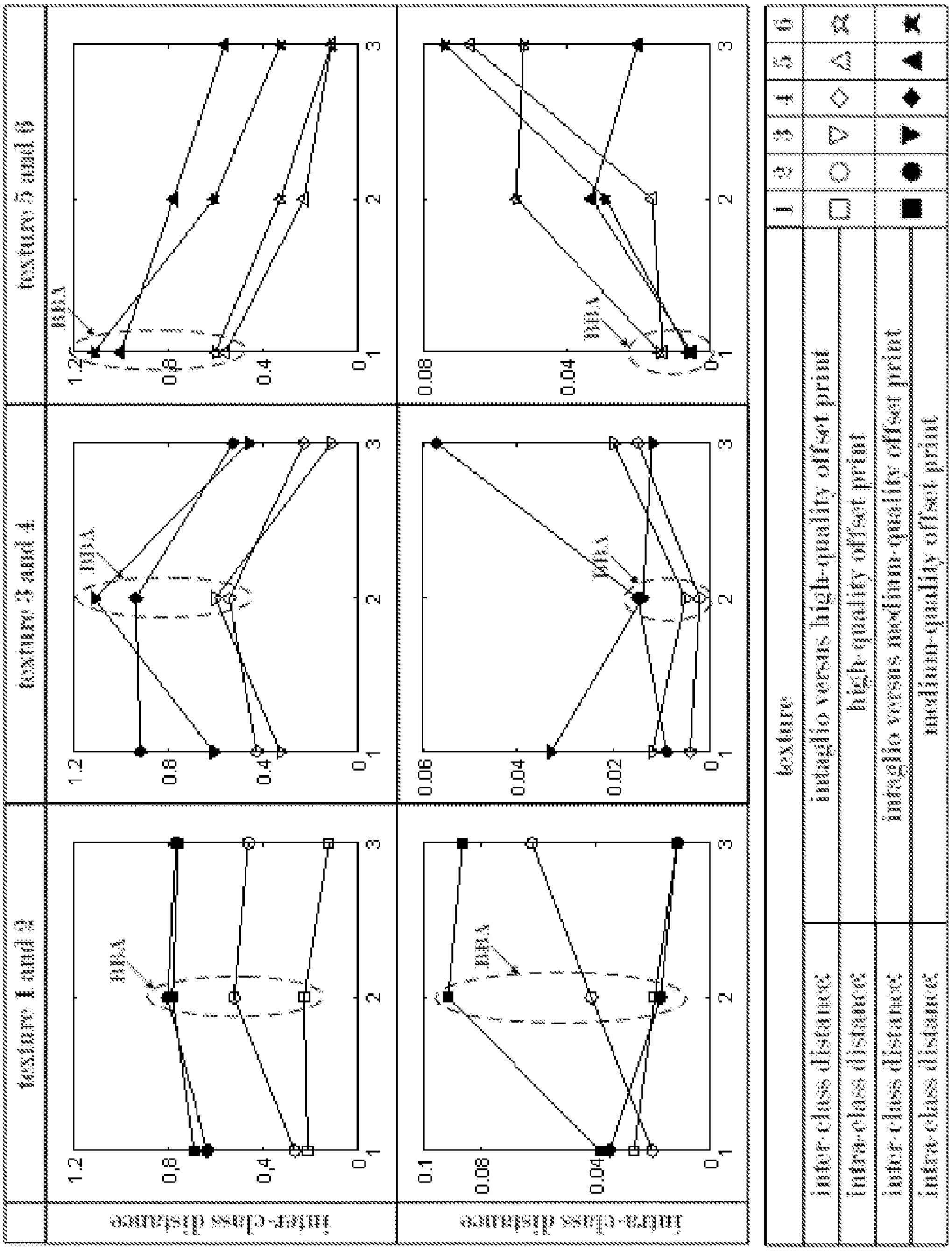
FIG. 10 is a diagram illustrating the inter-class and intra-class distance of the textures of FIG. 9 printed by intaglio printing and by medium- and high-quality commercial offset printing.

For the estimation of separation results, the extracted features have been normalized to a uniform range of values between 0 and 1. FIG. 10 shows the inter- and intra-class distance between the intaglio-printed textures and the medium- and high-quality commercial offset printed textures, respectively, for the first three decomposition levels (indicated on the horizontal axes in FIG. 10). The dashed line highlights the corresponding decomposition level where the Best Branch Algorithm has stopped the decomposition.

It can be observed in FIG. 10 that the Best Branch Algorithm has stopped the decomposition at the level which achieves the best inter-class distance between the intaglio-printed textures and the medium- or high-quality commercial offset printed textures with a rate of 100%. The corresponding intra-class distance of the medium- and high-quality commercial offset printed textures is minimized in most cases with a rate of approximately 60%. Even though the intra-class distance is not minimized for all of the 900 investigated textures, it can be observed that the classes are narrowly distributed. Therefore, on average, the BBA stops at the level where the classes are best separated and lowest expanded.

FIG. 10 demonstrates that the Best Branch Algorithm (BBA) stops the decomposition for all 900 investigated textures at the level where they are best characterized. In this way, the best inter-class distance is reached with a rate of 100%. Even if the intra-class distance does not reach its minimum in all cases, the class clusters are still narrowly distributed as schematically illustrated in FIG. 11.

Figure 11:
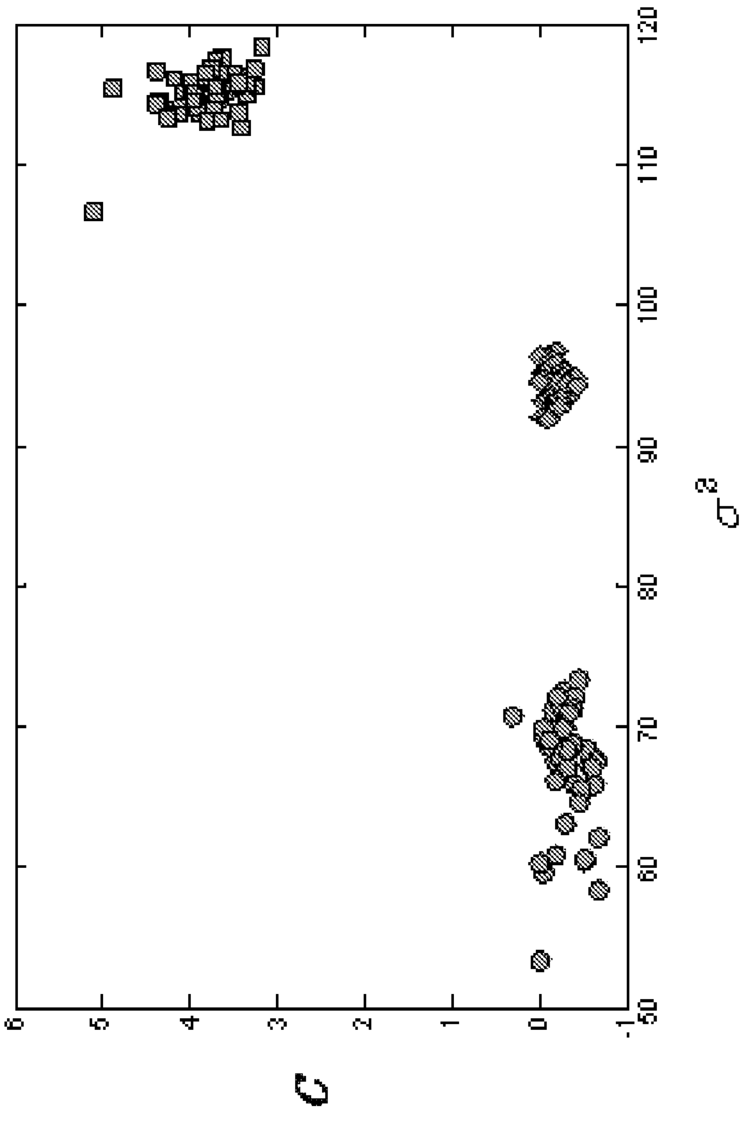
FIG. 11 is a two-dimensional feature space illustrating the classification of the samples after processing based on the variance $\sigma^2$ and excess C of the statistical distribution of the wavelet coefficients resulting from the decomposition of the sample image according to the invention.

FIG. 11 shows a two-dimensional feature space where the relevant textures have been classified on the basis of their variance $\sigma^2$ (along the horizontal axis in FIG. 11) and the excess C (along the vertical axis in FIG. 11) of the distribution of the wavelet coefficients resulting from the decomposition using the BBA.

The circles on the lower-right corner of FIG. 11 designate the medium-quality commercial offset printed textures, while the diamonds on the lower middle portion of FIG. 11 designate the high-quality commercial offset printed textures. The squares on the upper-left corner of FIG. 11 designate the intaglio-printed textures.

As already mentioned, FIG. 11 shows that the BBA stops on average at the level where the classes are best separated and lowest expanded. This enables a simple separation of the various class clusters using linear boundaries.

The separation result is independent of production tolerances like transitions and varying contrast. Indeed, all investigated features shown in FIG. 9 are closely clustered even though they are clearly different in contrast, latitude of gray-scale transitions and structure. It has been observed that the position of the best branch in the tree can vary widely from sample to sample. Thus, the particular node position found by the BBA should not normally be used as a classifying feature.

The execution time of the incomplete 2D-SIWPT based on the BBA can be defined as O(log 2(N)), where N=M×M is the size of the texture image, which execution time is perfectly suitable for a practical implementation, for instance on a Field Programmable Gate Array (FPGA).

The proposed incomplete two-dimensional shift invariant Wavelet Packet Transform for discrimination of different textures printed on security documents, especially banknotes has demonstrated a very good performance to achieve the goal of checking the authenticity of security documents, in particular banknotes. This approach is in particular highly suitable to robustly detecting security features printed, applied or otherwise provided on security documents such as banknotes, in particular for the detection of intaglio-printed patterns.

Beside the variance $\sigma^2$ (and the standard deviation $\sigma$) and the excess C (or excess kurtosis), further statistical parameters might be used to characterize the statistical distribution of the wavelet coefficients, namely (see also FIG. 13 and the relevant description thereof in WO 2008/146262 A2):

- the arithmetic mean of the wavelet coefficients—also referred to in statistics as the "first moment";
- the skewness of the statistical distribution of the wavelet coefficients—also referred to in statistics as the "third moment"—which is a measure of the asymmetry of the statistical distribution; and/or
- the statistical entropy, which is a measure of changes in the statistical distribution.

For the purpose of feature extraction, the above-listed moments (including the variance) shall be normalized to enable proper comparison and classification of various candidate documents.

FIG. 21 schematically illustrates an implementation of a device for checking the authenticity of security documents, in particular banknotes, according to the above-described method. This device comprises an optical system 100 for acquiring a sample image (image $c^0$) of the region of interest R.o.I. on a candidate document 1 to be authenticated, and a digital signal processing (DSP) unit 200 programmed for performing the digital processing of the sample image. The DSP 200 may in particular advantageously be implemented as a Field-Programmable-Gate-Array (FPGA) unit.

Figure 12:
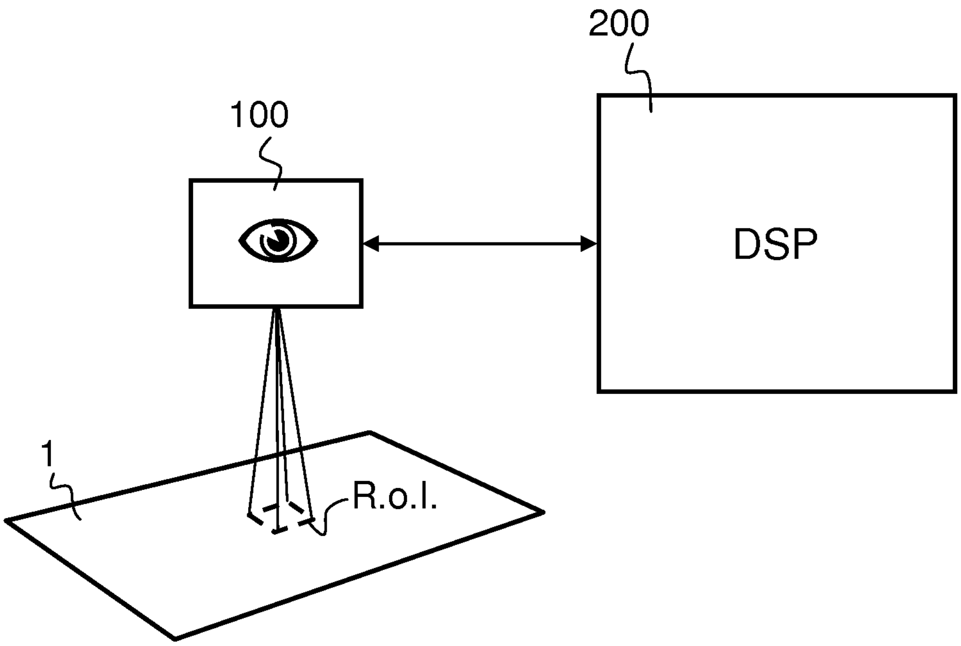
FIG. 12 is a schematic diagram of a device for checking the authenticity of security documents according to the method of the present invention.

The device of FIG. 12 may in particular be embodied in the form of a portable electronic device with integrated image-acquisition capability such as a smart phone.

It will be appreciated that the above-described invention can be applied for simply detecting security features (in particular intaglio-printed patterns) printed, applied or otherwise provided on security documents, especially banknotes.

As explained above, the classifying features may conveniently be statistical parameters selected from the group comprising the arithmetic mean, the variance ($\sigma^2$), the skewness, the excess (C), and the entropy of the statistical distribution of the wavelet coefficients resulting from the decomposition of the sample image.

It shall further be appreciated that the method may provide for the determination of an authenticity rating of a candidate document based on the extracted classifying features. Such an authenticity rating computed according to the above described method can be optimised by designing the security features that are to be printed, applied, or otherwise provided on the security documents in such a way as to optimise the authenticity rating of genuine documents.

Such optimisation can in particular be achieved by acting on security features including intaglio patterns, line offset patterns, letterpress patterns, optically-diffractive structures and/or combinations thereof. A high density of such patterns, preferably linear or curvilinear intaglio-printed patterns, as shown for instance in FIG. 2*b*, would in particular be desirable.

Various modifications and/or improvements may be made to the above-described embodiments without departing from the scope of the invention as defined by the annexed claims.

For instance, as already mentioned, while the authentication principle is preferably based on the processing of an image containing (or supposed to be containing) intaglio-printed patterns, the invention can be applied by analogy to the processing of an image containing other security features comprising characteristic visual features intrinsic to the processes used for producing the security documents, in particular line offset patterns, letterpress patterns, optically-diffractive structures and/or combinations thereof.

Furthermore, while a processing of the statistical distribution of the spectral coefficients has been described as a way to extract classifying features for determining the class of textures being investigated, any other suitable processing could be envisaged as long as such processing enables to isolate and derive features that are sufficiently representative of the security features being investigated and can efficiently discriminate genuine documents from counterfeits.

Obviously, a plurality of sample images corresponding to several regions of interest of the same candidate document may be digitally processed according to the invention. In any case, each region of interest is preferably selected to include a high density of patterns, preferably linear or curvilinear intaglio-printed patterns as shown for instance in FIG. 2*b* (see also FIG. 9).

CITED LITTERATURE

| | |
|---|---|
| [Mallat1989] | Stéphane G. Mallat, “A Theory for Multiresolution Signal Decomposition: The Wavelet Representation”, IEEE Transactions on Pattern Analysis and Machine Intelligence, Vol. 11, No. 7 (Jul. 7, 1989), pp. 674 to 693 |
| [Unser1995] | Michael Unser, “Texture classification and segmentation using wavelet frames”, IEEE Transactions on Image Processing, Vol. 4, No. 11 (November 1995], pp. 1549 to 1560 |
| [Chang1993] | Tianhorng Chang and C.-C. Jay Kuo, “Texture Analysis and Classification with Tree-Structured Wavelet Transfrom”, IEEE Transactions on Image Processing, Vol. 2, No. 4 (October 1993), pp. 429 to 441 |
| [Dyck2008] | Walter Dyck, Thomas Türke, Johannes Schaede and Volker Lohweg, “A New Concept on Quality Inspection and Machine Conditioning for Security Prints”, Optical Document Security, 2008 Conference on Optical Security and Counterfeit Deterrence, San Francisco, CA, USA, Reconnaissance International Publishers and Consultants (Jan. 23-25, 2008), IEEE Transactions on Pattern Analysis and Machine Intelligence, Vol. 11, No. 7 (Jul. 7, 1989), 9 pages, published on CD-ROM |
| [vanRenesse2005] | Rudolf L. van Renesse, “Optical Document Security”, Third Edition (2005), Artech House Boston/London, Artech House Optoelectronics Library (ISBN 1-58053-258-6), pp. 115 to 120. |
| [Schaede2006] | Johannes Schaede and Volker Lohweg, “The Mechanisms of Human Recognition as a Guideline for Security Feature Development”, Optical Security and Counterfeit Deterrence Techniques VI, edited by Rudolf L. van Renesse, Proceedings of SPIE-IS&T Electronic Imaging, SPIE Vol. 6075 (2006), pp. 607507-1 to 607507-10 |
| [Jiang2003] | Xiao-Yue Jiang and Rong-Chuan Zhao, “Segmentation Based on Incomplete Wavelet Packet Frame”, IEEE Proceedings of the Second International Conference on Machine Learning and Cybernetics, Xi’an (Nov. 2-5, 2003), pp. 3172 to 3177 |
| [Zhang2002] | Jianguo Zhang and Tieniu Tan, “Brief Review of Invariant Texture Analysis Methods”, Pattern Recognition Society, 35 (2002), pp. 735 to 747 |
| [Coifman1992] | Ronald R. Coifman and Mladen Victor Wickerhauser, “Entropy-Based Algorithms for Best Basis Selection”, IEEE Transactions on Information Theory, Vol. 38, No. 2 (March 1992), pp. 713 to 718 |
| [Shensa1992] | Mark J. Shensa, “The Discrete Wavelet Transfrom: Wedding the À Trous and Mallat Algorithms”, IEEE Transactions on Signal Processing, Vol. 40, No. 10 (October 1992), pp. 2464 to 2482 |
| [Daubechies1992] | Ingrid Daubechies, “Ten Lectures on Wavelets”, CBMS-NSF Regional Conference Series in Applied Mathematics 61, SIAM (Society for Industrial and Applied Mathematics), $2^{nd}$ edition, 1992, ISBN 0-89871-274-2 |
| [Saito1994] | Naoki Saito, “Local Feature Extraction and its Applications using a Library of Bases”, PhD Thesis, Yale University (December 1994) |
| [Wang2008] | Qiong Wang, Hong Li, and Jian Liu, “Subset Selection Using Rough Set in Wavelet Packet Based Texture Classification”, Proceedings of the 2008 International Conference on Wavelet Analysis and Pattern Recognition, Hong Kong (Aug. 30-31, 2008), pp. 662 to 666 |
| [Wang2000] | Xiaidan Wang, Hua Jin, and Rongchun Zhao, “Texture Segmentation Method Based on Incomplete Tree Structured Wavelet Transform and Fuzzy Kohonen Clustering Network”, Proceedings of the $3^{rd}$ World Congress on Intelligent Control and Automation (Jun. 28-Jul. 2m 2000), pp. 2684 to 2687 |
| [Choi2006] | Euisun Choi, Jongseok Lee, and Joonhyun Yoon, “Feature Extraction for Bank Note Classification Using Wavelet Transform”, IEEE Proceedings of the $18^{th}$ International Conference on Pattern Recognition, ICPR’06 (2006), pp. 934 to 937 |
| [Fowler2005] | James E. Fowler, “The Redundant Discrete Wavelet Transform and Additive Noise”, IEEE Signal Processing Letters, Vol. 12, No. 9 (September 2005), pp. 629 to 632 |

The invention claimed is:

1. A method for checking the authenticity of security documents, wherein authentic security documents comprise security features printed, applied or otherwise provided on the security documents, which security features comprise characteristic visual features intrinsic to the processes used for producing the security documents, the method comprising the step of digitally processing a sample image of at least one region of interest (R.o.I.) of the surface of a candidate document to be authenticated, which region of interest encompasses at least part of the security features, the digital processing including performing a decomposition of the sample image by means of wavelet transform (WT) of the sample image, wherein the decomposition of the sample image is based on a wavelet packet transform (WPT) of the sample image.

2. The method according to claim 1, wherein the wavelet packet transform (WPT) is a two-dimensional shift-invariant wavelet packet transform (2D-SIWPT).

3. The method according to claim 1, wherein the decomposition of the sample image is based on an incomplete wavelet packet transform.

4. The method according to claim 3, wherein the decomposition of the sample image includes decomposition of the sample image into a wavelet packet tree comprising at least one approximation node (Ai,j) and detail nodes (cVi,j, cHi,j, cDi,j), and looking for the detail node within the wavelet packet tree that has the highest information content.

5. The method according to claim 4, wherein the node having the highest information content is determined based on a best branch algorithm (BBA).

6. The method according to claim 5, wherein the best branch algorithm (BBA) involves:

decomposition of the sample image into at least a first decomposition level (i=1), determination of the detail node, or best node, (cB1) amongst the detail nodes (cV1,1, cH1,2, cD1,3) of the first decomposition level that has the highest information content, and further decomposition of the approximation node (A1,0) and of the best node (cB1) of the first decomposition level into at least a second decomposition level (i=2).

7. The method according to claim 4, wherein the node having the highest information content is determined to be the node amongst nodes of a given decomposition level (i) which exhibits the highest variance.

8. The method according to any claim 1, comprising digitally processing a plurality of sample images corresponding to several regions of interest (R.o.I.) of the same candidate document.

9. The method according to claim 1, wherein the at least one region of interest (R.o.I.) is selected to include a high density of patterns.

10. The method according to claim 9, wherein the at least one region of interest (R.o.I.) is selected to include patterns of a pictorial representation provided on the candidate document.

11. The method according to claim 1, further comprising the extraction of classifying features from the decomposition of the sample image.

12. The method according to claim 11, wherein the classifying features are statistical parameters selected from the group comprising the arithmetic mean, the variance, the skewness, the excess, and the entropy of the statistical distribution of the wavelet coefficients resulting from the decomposition of the sample image.

13. The method according to claim 11, further comprising the step of deriving an authenticity rating of the candidate document based on the extracted classifying features.

14. A method for producing security documents comprising the step of designing security features to be printed, applied, or otherwise provided on the security documents, wherein the security features are designed in such a way as to optimise an authenticity rating of genuine documents determined in accordance with the method as defined in claim 13.

15. The method according to claim 14, wherein the security features are designed such as to include a high density of patterns.

16. A digital signal processing unit for processing image data of a sample image of at least one region of interest (R.o.I.) of the surface of a candidate document to be authenticated according to the method of claim 1, the digital signal processing unit being programmed for performing the digital processing of the sample image.

17. The digital signal processing unit of claim 16, implemented as a Field-Programmable-Gate-Array (FPGA) unit.

18. A device for checking the authenticity of security documents according to the method of claim 1, comprising an optical system for acquiring the sample image of the region of interest (R.o.I.) and a digital signal processing unit programmed for performing the digital processing of the sample image.

19. The device according to claim 18, wherein the digital signal processing unit is implemented as a Field-Programmable-Gate-Array (FPGA) unit.

20. The device according to claim 18, implemented as a portable electronic device with integrated image-acquisition capability.

21. A method for detecting security features printed, applied or otherwise provided on security documents which security features comprise characteristic visual features intrinsic to the processes used for producing the security documents, the method comprising the step of digitally processing a sample image of at least one region of interest (R.o.I.) of the surface of a candidate document, which region of interest (R.o.I.) is selected to include at least a portion of the security features, the digital processing including performing a decomposition of the sample image by means of wavelet transform (WT) of the sample image, wherein the decomposition of the sample image is based on a wavelet packet transform (WPT) of the sample image.

22. The method according to claim 21, wherein the wavelet packet transform (WPT) is a two-dimensional shift-invariant wavelet packet transform (2D-SIWPT).

23. The method according to claim 21, wherein the decomposition of the sample image is based on an incomplete wavelet packet transform.

24. The method according to claim 23, wherein the decomposition of the sample image includes decomposition of the sample image into a wavelet packet tree comprising at least one approximation node (Ai,j) and detail nodes (cVi,j, cHi,j, cDi,j) and looking for the detail node within the wavelet packet tree that has the highest information content.

25. The method according to claim 24, wherein the node having the highest information content is determined based on a best branch algorithm (BBA).

26. The method according to claim 25, wherein the best branch algorithm (BBA) involves:

decomposition of the sample image into at least a first decomposition level (i=1), determination of the detail node, or best node, (cB1) amongst the detail nodes (cV1,1, cH1,2, cD1,3) of the first decomposition level that has the highest information content, and further decomposition of the approximation node (A1,0) and of the best node (cB1) of the first decomposition level into at least a second decomposition level (i=2).

27. The method according to claim 24, wherein the node having the highest information content is determined to be the node amongst nodes of a given decomposition level (i) which exhibits the highest variance.

28. The method according to claim 21, for detecting intaglio-printed patterns.

29. The method according to claim 1, wherein the security documents are banknotes.

30. The method according to claim 9, wherein the patterns are linear or curvilinear intaglio-printed patterns.

31. The method according to claim 10, wherein the pictorial representation is a portrait.

32. The method according to claim 14, wherein the security documents are banknotes.

33. The method according to claim 15, wherein the patterns are linear or curvilinear intaglio-printed patterns.

34. The method according to claim 20, wherein the portable electronic device with integrated image-acquisition capability is a smart phone.

35. The method according to claim 21, wherein the security documents are banknotes.

* * * * *